Oct. 22, 1957  K. A. GRANT  2,810,590
DEVICE FOR COUPLING A TRACTOR TO A TRAILER VEHICLE
Filed Nov. 10, 1953  3 Sheets-Sheet 3
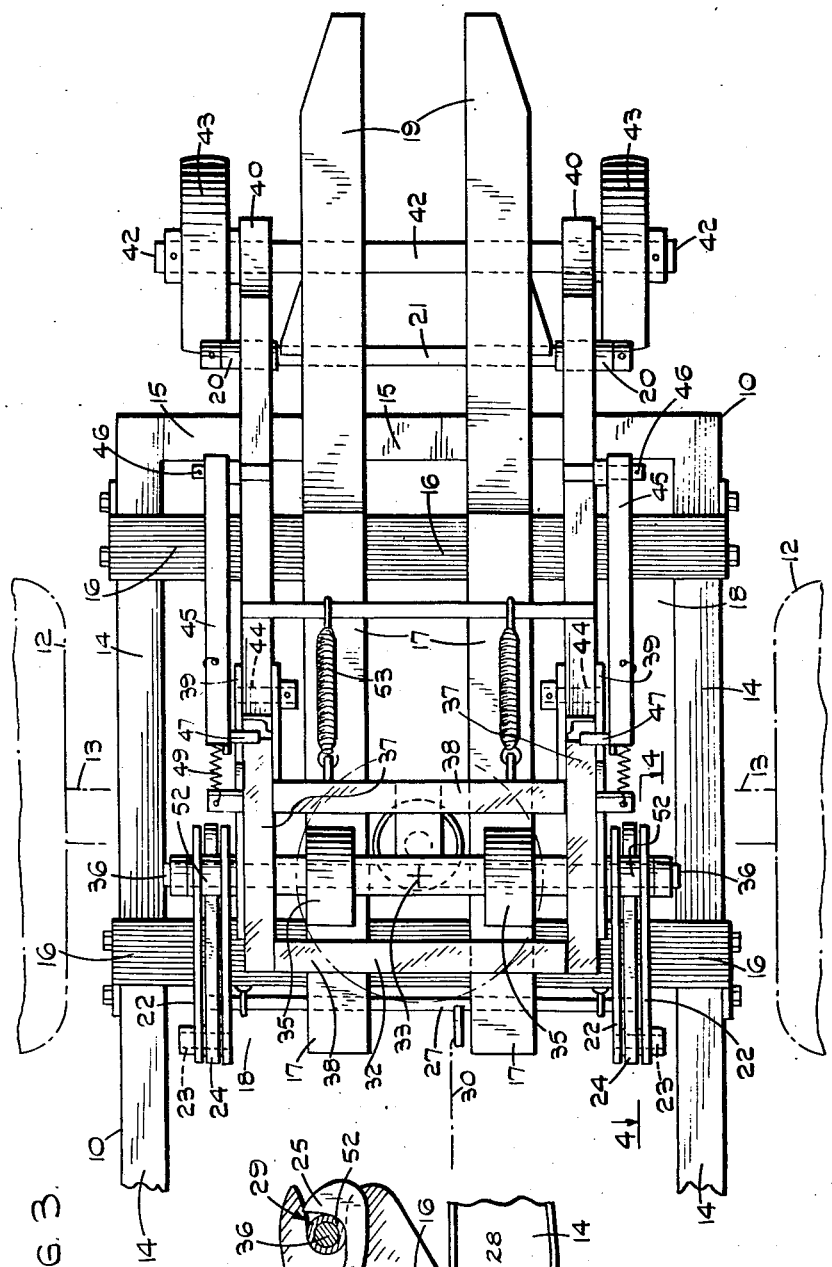
INVENTOR
Kenneth Alexander Grant
BY
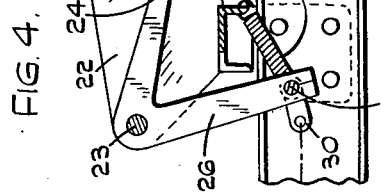
ATTORNEYS

United States Patent Office 2,810,590
Patented Oct. 22, 1957

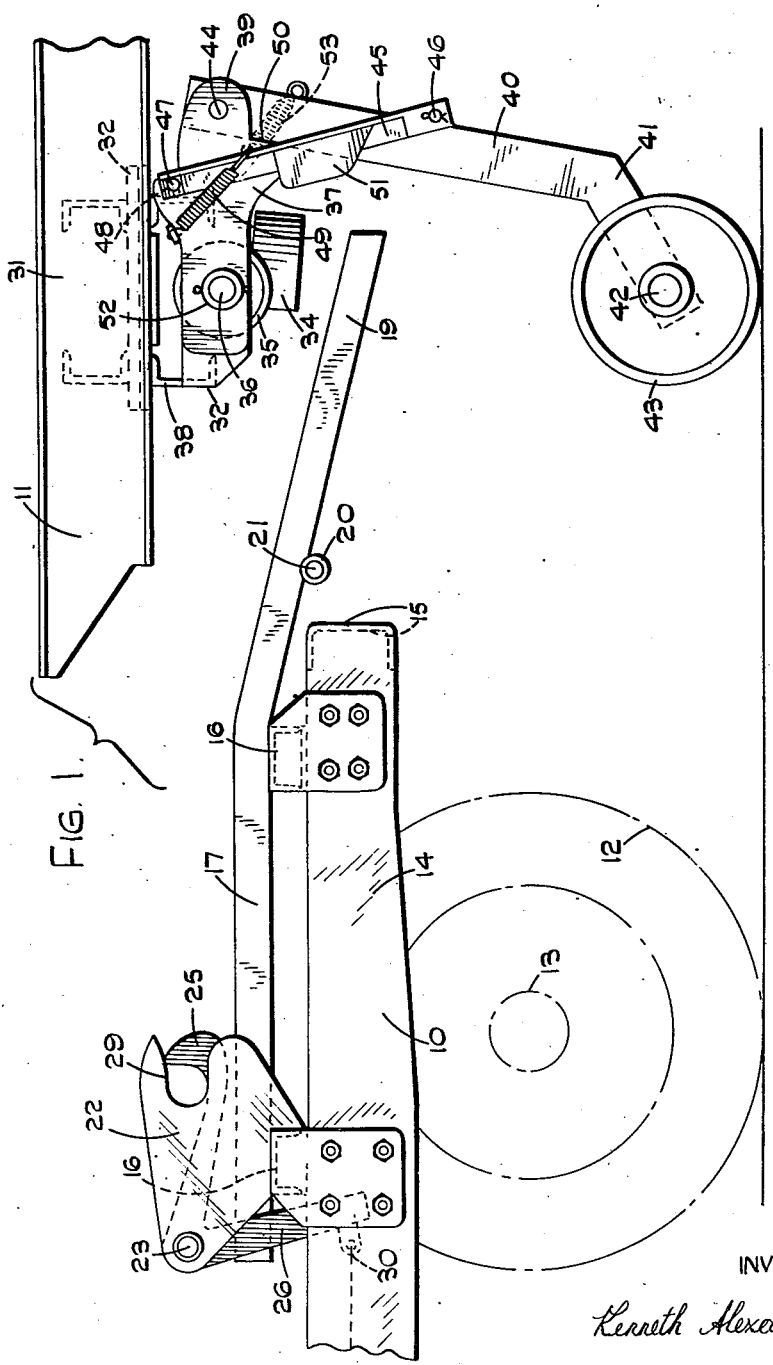

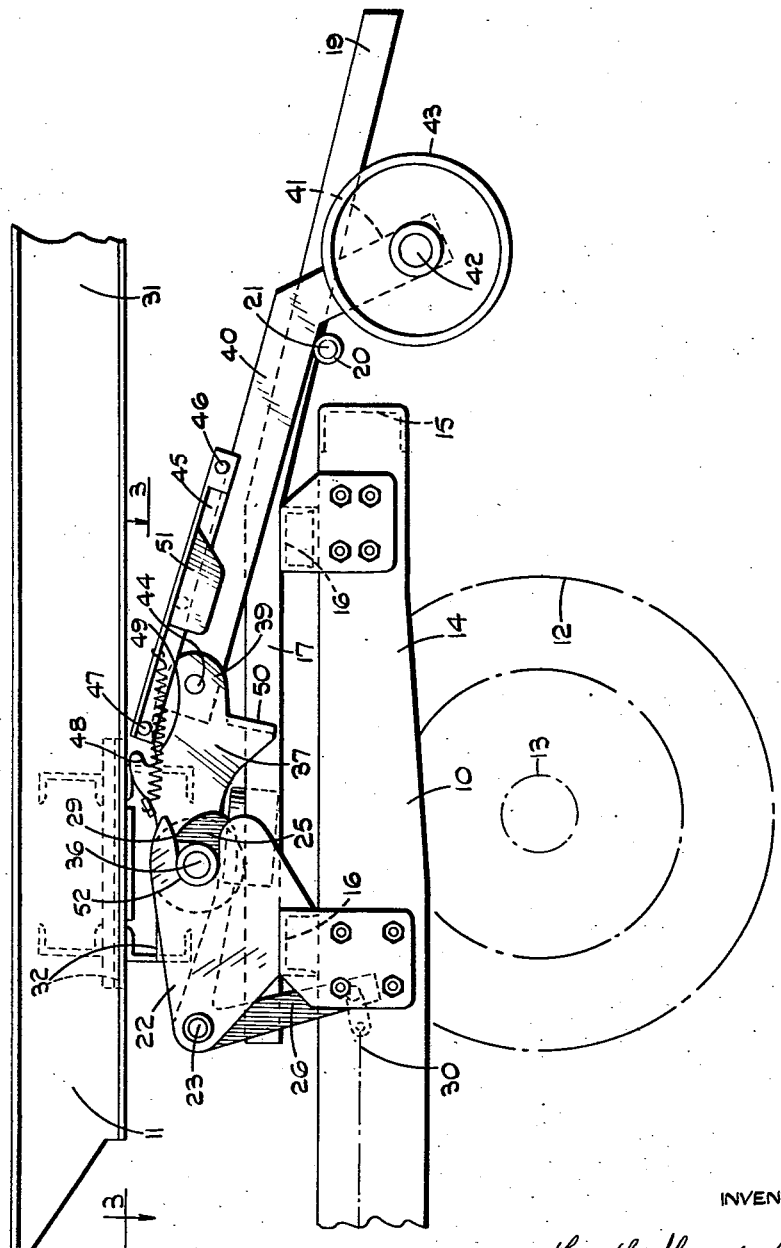

2,810,590

DEVICE FOR COUPLING A TRACTOR TO A TRAILER VEHICLE

Kenneth Alexander Grant, Edinburgh, Scotland, assignor to J. Brockhouse & Company Limited, Hill Top, West Bromwich, England, a British company Application November 10, 1953, Serial No. 391,287

2 Claims. (Cl. 280—429)

This invention relates to a new or improved device for coupling a tractor to a trailer vehicle, which device is of the kind in which the trailer vehicle is provided at the front thereof with temporary supporting means adapted to engage with the ground and by which the front of the trailer is supported when not coupled to the tractor, the supporting means being adapted to be raised relative to the trailer during the operation of coupling the trailer to the tractor, the tractor embodying a chassis having a pair of transversely spaced longitudinal members extending to the rear end of the tractor.

With devices of the foregoing kind as hitherto constructed the temporary supporting means has generally comprised a pair of ground engaging wheels disposed in transversely spaced relationship each wheel being mounted on one end of a corresponding arm, the two arms being similarly transversely spaced and the opposite end of each arm being connected displaceably to the front end of the trailer, the arrangement being such as to permit of the desired raising of the wheels clear of the ground.

With such hitherto known arrangements if the transverse spacing between the two arms is less than the distance between the two rear ends of the usual two longitudinal members of the tractor chassis any cross member extending, as is customary, between the rear ends of these longitudinal members will necessarily foul the said supporting wheel arms during the operation of coupling the tractor to the trailer.

Accordingly where the spacing of the two wheel supporting arms is as above described, and it is desired to apply such coupling device to existing tractor vehicles, it is in practise necessary to modify these vehicles to the extent of removing the cross member joining the rear ends of the two longitudinal members of the tractor chassis and inserting the cross member in some other position. Such modification or alteration of the position of the rear cross member of the tractor chassis is necessarily an inconvenient and troublesome operation.

Further, in the event of the rear or rearmost axle of the tractor vehicle being disposed at the rear extremity of the tractor chassis it becomes impossible to couple the tractor to a trailer vehicle having the above form of temporary front support without fouling the said axle by the said trailer support.

The aforesaid difficulties can be avoided insofar as the rear cross member of the tractor chassis is concerned by increasing the transverse spacing between the said supporting wheel arms so that the entire rear end of the tractor chassis can extend between the said two arms during the operation of coupling the two vehicles together, but such an arrangement is open to the objection that the two arms and their associated supporting wheels are then undesirably exposed at each side of the tractor vehicle when coupled thereto so as then to be liable to damage from extraneous objects.

Further, the aforesaid increased lateral spacing between the two supporting wheel arms becomes impracticable where the rear axle with its associated wheels of the tractor vehicle is disposed on the rear extremity of the tractor chassis in that the said arms would then either foul the tractor wheels themselves when coupled to the tractor or else would project right outside the rear wheel base of the tractor so as to be most undesirably exposed to damage apart from possibly undesirably increasing the overall width of the tractor when this is coupled to the trailer vehicle.

The present invention has for its object the provision of an improved arrangement which seeks to overcome the foregoing disadvantages of the hitherto known constructions of devices of the above kind.

The present invention comprises in a coupling device of the kind hereinbefore specified, the provision of a support for the front end of the trailer vehicle adapted when the trailer is coupled to the tractor to be disposed within an overall transverse dimension less than the distance between opposed faces of the two longitudinal members of the tractor chassis so that said support is protected against extraneous damage with the vehicles in the coupled position, a cross member joining the two longitudinal members of the tractor chassis and disposed at the rear end of the tractor vehicle, and means associated with the rear end of the tractor vehicle disposed immediately adjacent to said cross member adapted to engage an abutment associated with said trailer support in consequence of the rearward movement of the tractor relative to the trailer, said trailer support being mounted for rearward and upward movement relative to the trailer, said abutment when engaged by said abutment engaging means on the tractor during the said rearward movement of the tractor relative to the trailer being adapted to impart upward and rearward movement of said trailer support relative to the trailer so as to lift this clear of the ground and clear of the said crossmember as the two vehicles move relatively into the fully coupled position.

The invention is illustrated in the accompanying drawings wherein:

Figure 1 is a side elevation depicting the rear part of a tractor vehicle and the front part of a trailer vehicle embodying coupling gear and constructed in accordance with the present invention, the two vehicles being depicted in position immediately prior to coupling together.

Figure 2 is a view similar to Figure 1 but showing the two vehicles fully coupled together.

Figure 3 is a sectional plan view on the line 3—3 of Figure 2.

Figure 4 is a detailed view on the line 4—4 of Figure 3.

In the drawings only a portion of each of the two vehicles to be coupled together is depicted, namely the rear end of the tractor vehicle 10 and the front end of the trailer vehicle 11.

The tractor vehicle is of any conventional form, being provided with a pair of rear wheels 12 mounted on a transverse axle 13; the tractor chassis embodying the usual pair of transversely spaced longitudinal chassis members 14, which members are connected together at their rear extremities by a cross member 15 as shown in Figure 3. This cross member 15 is disposed in the position which it would ordinarily occupy if the tractor vehicle were not coupled to a trailer vehicle in accordance with the present invention, that is to say no modification of the position of this cross member 15 is required with coupling gear in accordance with the present invention.

A short distance forwardly of the cross member 15 the chassis longitudinal members 14 are joined by a pair of longitudinally spaced transversely extending brackets 16 of inverted channel configuration the sides of which brackets, as shown for example in Figure 2, are secured to the longitudinal members of the tractor and these brackets serve as most clearly shown in Figure 3 to support a pair of longitudinally extending ramps 17 spaced transversely from one another by a distance substantially less than the distance between the two longitudinal members 14 so as to provide as clearly shown in Figure 3 a substantial space 18 between the near side of each longitudinal member 14 and the adjacent ramp 17.

The two ramps extend rearwardly a short distance beyond the cross member 15 and have their rear portions inclined downwardly to the horizontal in a rearward direction as clearly shown at 19 in Figures 1 and 2.

These portions 19 of the two ramps carry immediately to the rear of the cross member 15 so as to be immediately adjacent thereto, trailer support engaging means in the form of a pair of rollers 20 mounted rotatably one on each end of a transverse shaft 21 supported from the said ramps, the rollers 20 being each longitudinally aligned with one of the two spaces 18 aforesaid.

The forward of the two brackets 16 has mounted on the upper side thereof two pairs of coupling guide plates 22 each pair being disposed between a ramp 17 and its adjacent longitudinal member 14 with the two plates in each pair disposed in closely spaced parallel relationship with their planes in each case extending longitudinally of the tractor.

Pivotally mounted between the two plates 22 on each pivot pin 23 is a coupling hook 24, each coupling hook being formed as a bell-crank lever, as most clearly shown in Figure 4, one arm thereof extending substantially horizontally rearwardly of the tractor and being formed at its extremity with a hook portion 25 with the other arm 26 extending downwardly from its associated pivot 23.

The two coupling hook arms 26 are joined together at their lower ends by a connecting bar 27 biased by a spring (see Figure 2) in a direction for pivoting each coupling hook 24 into its operative or coupling position in which the nose of the hook portion thereof 25 is aligned with a rearwardly directed mouth or opening 29 formed by recessing, as most clearly shown in Figure 4, each of the coupling guide plates 22 along their rear edges.

The connecting bar 27 aforesaid is connected by pull operated mechanism 30 to an operating lever situated in the cab or driving compartment of the tractor vehicle, not shown, whereby the two coupling hooks can be pivoted into an inoperative position in which their hook portions 25 are out of alignment with the said plate mouths 29 for the purpose, as hereinafter described, of permitting uncoupling of the trailer vehicle from the tractor.

The trailer vehicle is provided at its front end beneath the front portion of its chassis 31 with a turntable undercarriage 32 of generally known form, such turntable undercarriage being adapted to pivot about a vertical axis indicated at 33 in Figure 3 in relation to the trailer vehicle and being provided on its underside with a central ramp engaging roller 34 mounted for rotation in relation to said carriage 32 about an axis which is somewhat to the rear of the said pivotal axis 33, which roller axis is further disposed at a small inclination to the vertical corresponding substantially to the inclination of the rear portions 19 of the two ramps 17.

This central ramp engaging roller 34 has a diameter slightly less than the distance between the opposed faces of the two ramps 17 so as to guide the front end of the trailer against undesired lateral movement relative to the tractor during the coupling operation.

The turntable undercarriage 32 is further provided at each of the lateral sides thereof with one of a pair of ramp riding rollers 35 mounted for rotation on opposite ends of a common transversely extending shaft 36, these rollers 35 being each adapted to engage with and ride on the upper surface of each of the ramps 17 during the coupling operation as well as to remain engaged therewith when the two vehicles are fully coupled together, as shown in Figure 2.

Disposed on each of the lateral sides of the turntable undercarriage 32 so as normally to extend substantially longitudinally of the trailer vehicle is a bracket 37, the two brackets being connected in spaced parallel relationship by transverse connecting bars 38, as shown most clearly in Figure 3, and having their rear ends formed to forked configuration as indicated at 39.

Between the two arms of each of these forks 39 is mounted for pivotal movement the upper end of a supporting wheel arm 40 and the arrangement is such that the two arms 40 are disposed in substantially the same longitudinal plane as their respective brackets; i. e. each in the same longitudinal plane as that of the aforesaid space 18 at each side of one of the ramps 17.

The arms 40 are disposed parallel to one another and are cranked at their opposite ends, as indicated at 41, the two cranked portions being joined by a supporting wheel axle 42, opposite ends of which project beyond the outer sides of the said arms 40 and carry each a supporting wheel 43; the overall wheel base of these two supporting wheels 43 being less than the distance between the opposed faces of the longitudinal members 14 of the tractor chassis.

The two supporting wheels 43 are adapted to support the front end of the trailer when it is uncoupled from the tractor, as shown in Figure 1, in which position the supporting wheel axle 42 is disposed vertically beneath the axis of pivoting 33 of the said turntable undercarriage 32 and it will be appreciated from the foregoing description that the supporting wheel arms 40, together with the wheels 43, are adapted to turn about said pivotal axis 33 with the turntable undercarriage 32.

As will be seen from Figures 1 and 2 the pivot 44 connecting each supporting wheel arm 40 to the turntable undercarriage is disposed rearwardly of the axis of pivoting 33 of the carriage; i. e. is disposed at a position to the rear of the supporting wheels 43 when these are disposed in their supporting position shown in Figure 1.

The supporting wheels 43 are maintained in this supporting position by providing each of the supporting wheel arms 40 with a locking stay 45 pivoted at one end thereof at 46 to the rear side of the corresponding arm 40 intermediate the two ends of the latter, each stay extending in a generally upward and forward direction from such pivot 46 and being provided at its upper end with a laterally extending locking pin 47 adapted to engage within a rearwardly directed locking recess 48 provided on the upper side of each bracket member 37.

Each stay 45 has its locking pin 47 biased into engagement with such recess 48 when the supporting wheels 43 are in their supporting position depicted in Figure 1 by means of a tension spring 49 operating between the forward portion of each stay and the adjacent bracket member 37 at a position forwardly thereof in relation to its locking recess 48.

With such an arrangement when the trailer vehicle is uncoupled from the tractor, as shown in Figure 1, rearward pivotal movement of each supporting arm 40 relative to the turntable undercarriage 32 is prevented by engagement of each locking pin 47 with the upper edge of the adjacent bracket member 37; i. e. with the lower horizontal side of the aforesaid recess 48, while forward pivotal movement of each supporting wheel arm 40 beyond the position depicted in Figure 1 is prevented by the forward edge of each arm engaging with a nose portion 50 on the lower side of the corresponding bracket member.

Rearward and upward pivotal movement of each supporting wheel arm and its associated supporting wheel relative to the trailer vehicle is, however, permitted when each stay locking pin 47 is displaced in a rearward direction clear of its associated recess 48 and to permit of this being effected during the operation of coupling the trailer vehicle to the tractor each stay 45 is provided with a striker plate 51, the outer edge of which is adapted to engage with the corresponding trailer support engaging means formed by each of the rollers 20 aforesaid and provided as already described at the rear of the tractor vehicle.

The said shaft 36 carrying the two ramp riding rollers 35 is extended beyond the bracket members 37 in manner depicted in Figure 3 and on each of its outer ends is rotatably mounted a coupling engaging roller 52 adapted during the coupling operation to ride up the rear edge of the nose of the hook portion 25 of each coupling hook 24 and displace these in a downward direction, each of these rollers 52 being adapted to be received snugly between the sides of the mouth 29 of a corresponding pair of coupling guide plates 22 when the two vehicles are fully coupled together.

In association with the turntable undercarriage 32 is trailer brake operating mechanism arranged as described in the specification of my co-pending application No. 391,288, filed November 10, 1953, but for clarity, in the drawings of the present specification the parts of this brake operating mechanism of both the trailer and the tractor vehicles have been omitted.

In operation when it is desired to couple the trailer vehicle to the tractor the tractor with the trailer vehicle parts as depicted in Figure 1 is backed so that the inclined portions 19 of the two ramps pass one beneath each of the two ramp riding rollers 35, the rear ends of the two ramps passing between the two supporting wheel arms 40 by which time the upper sides of the inclined ramp portions 19 will have engaged with the ramp riding rollers 35 so as to take the load off the supporting wheels 43.

During this coupling operation the trailer brake, which would operate on the rear wheels of the trailer not shown, is in the on position so that as the tractor continues to back it necessarily moves rearwardly in relation to the trailer thus bringing the aforesaid rollers 20 on the tractor into engagement with the corresponding striker plates 51 thus pivoting the stays 45 rearwardly and bringing their locking pins 47 well clear of both the locking recesses 48 and the upper side of the adjacent bracket member 37.

As the rearward movement of the tractor continues the rollers 20, which are made sufficiently long for this purpose, engage with the forward sides of the wheel arms 40, which are now free to pivot with their associated stays in a rearward and upward direction about their associated bracket member pivots 44.

As the tractor continues to move rearwardly the horizontal portions 17 of the ramps now engage beneath the ramp riding rollers 35 while the rollers 20 continue to ride along the forward edge of each supporting wheel arm 40 until the parts approach the position depicted in Figure 2, in which position the coupling hook rollers 52 engage as already described with the noses of the hook portions 25 of a corresponding coupling on the tractor pivoting the same in a downward direction against the pressure of spring 28 so as to permit of each roller 52 riding over the extremity of each hook portion 25 into the mouth 29 provided on the rear side of the corresponding pair of coupling guide plates 22 until when each roller 52 is fully within such mouth each coupling hook is free to return to its operative position depicted in Figure 2 under the pressure of the spring 28, in which position the parts are fully coupled together.

The arrangement is such that at no time has any part of the front support of the trailer fouled the rear cross member 15, despite its disposition at the extreme rear end of the tractor longitudinal members 14, while as will be appreciated from a consideration of Figure 3 when the parts are fully coupled together the support for the front end of the trailer; i. e. in particular the wheels 43 and arms 40 are disposed well within the overall width of the rear end of the tractor chassis and are further disposed well within the overall width of the rear wheel base of the tractor so as in the fully coupled position to be well protected.

Uncoupling of the tractor from the trailer is effected by a reverse operation by the driver actuating the pull operating mechanism 30 to disengage the two coupling hooks from the rollers 52 thus permitting of the tractor moving forwardly relative to the trailer and as the rollers 20 on the tractor move forwardly relative to the supporting wheel arms 40 these, under their weight and under the weight of the supporting wheels swing rearwardly and downwardly such movement being assisted and completed by tension springs 53, the supporting wheels and arms being finally brought into their forward pivotal position under the tension of the stay springs 49 and the said springs 53, so that the parts now occupy the position depicted in Figure 1 just before the tractor has moved forwardly a sufficient distance as to lower the front end of the trailer enough to bring its wheels 43 into engagement with the ground, the wheels engaging with the ground as the tractor completes its forward movement to disengage the inclined ramp portions 19 from the ramp riding rollers 35.

In place of the supporting wheels 43 of the front support for the trailer there may be provided feet or other non-rotatable members carried on the lower end of the said arms 40 and adapted to engage with the ground when the parts are in the position depicted in Figure 1 of the drawings.

With the construction above described it will be appreciated that when the tractor is coupled to the trailer the coupling of the two vehicles together is performed in an entirely automatic manner by the mere operation of backing the tractor in relation to the trailer, which operation serves without any special intervention on the part of the operator automatically to displace the temporary support for the front end of the trailer rearwardly and upwardly into a position well clear of the ground during such time as the two vehicles are coupled together.

Furthermore uncoupling of the two vehicles is effected by the mere operation of the pull-operated mechanism 30 as above described after which uncoupling of the tractor from the trailer is effected by the driver merely moving forwardly in relation to the trailer and in consequence of such operation the temporary support returns automatically to its operative position depicted in Figure 1 without any further operation on the part of the operator being required.

The above described results are furthermore achieved without modification of the tractor chassis to the extent of displacing the rear cross bar from its usual position adjoining the rear extremities of the two longitudinal members of the tractor chassis.

Furthermore as described in the aforesaid specification of the same date the operation of coupling and uncoupling the two vehicles may serve automatically respectively to permit of manual operation of the trailer brake from the tractor and to apply the trailer brake; i. e. as a result of the uncoupling operation, the arrangement ensuring that the trailer is held against movement while not actually coupled to the tractor as is necessary for the coupling gear above described to operate in the manner already indicated.

What I claim then is:

1. A tractor-trailer vehicle coupling assembly comprising the combination of a tractor chassis embodying a pair of longitudinal members connected together at the rear extremity of the tractor chassis by a cross member, and a trailer provided at its forward end with a retractible ground engaging support embodying a turn-table element mounted for swivelling movement about a substantially vertical axis on the forward end of the trailer, a leg element connected pivotally about a horizontal transverse axis to the turn-table element at a position rearwardly of the axis of pivoting of the latter, the leg element being provided at its opposite end with bearing means for supporting rotatably a ground engaging wheel, said turn-table element being provided at its upper side with a rearwardly directed open-mouthed recess, a locking stay pivoted at one end thereof to the leg element at a position intermediate the ends of the leg element, a projection on the other end of the locking stay adapted to engage with said recess to retain the leg element in its operative position, spring means for releasably retaining said projection within said recess, a striking abutment on the locking stay at a position intermediate the two ends thereof and at a horizontal level below that of the leg element pivot to the turn-table element, a ramp rail on the tractor extending rearwardly of said cross member, a roller on the turn-table abutment adapted to be engaged by said ramp rail to support the front end of the trailer from the tractor, and an abutment on the ramp rail spaced rearwardly of said cross member adapted to engage successively with the striker abutment on the locking stay and with the forward side of the leg element to displace the latter rearwardly and upwardly about its pivot out of contact with the tractor chassis cross member during the coupling operation.

2. A tractor-trailer vehicle coupling assembly comprising the combination of a tractor chassis embodying a pair of longitudinal members connected together at the rear extremity of the tractor chassis by a cross member, and a trailer provided at its forward end with a retractible ground engaging support embodying a turn-table element mounted on the underside of the forward end of the trailer for swivelling movement in relation thereto about a substantially vertical axis, a pair of transversely spaced ramp engaging rollers on said turn-table element, a pair of rearward extensions on said turn-table element, a leg element pivoted about a horizontal transverse axis to each such extension, so as operatively to depend therefrom, a wheel supported rotatably from the lower end of each leg element, a locking stay pivoted at one end to each leg element at a position intermediate the two ends of the latter, each of said turn-table element extensions being formed with a rearwardly extending open-mouthed recess at its upper side, a pin on the other end of each locking stay adapted to engage within said recess, a spring operating between each stay and the turn-table element for retaining the pin within the corresponding recess, and a striker plate on each locking stay intermediate the two ends thereof projecting forwardly of the adjacent part of the leg element, abutment means supported from the tractor at a position spaced rearwardly of said cross member, said abutment means being adapted during the backing of the tractor toward the trailer to engage successively with said striker plates and said leg element to displace them upwardly and rearwardly relative to the trailer vehicle out of contact with said tractor chassis cross member during the coupling operation.

References Cited in the file of this patent

UNITED STATES PATENTS

| | | |
|---|---|---|
| 1,316,735 | Olds | Sept. 23, 1919 |
| 1,844,140 | Alten | Feb. 9, 1932 |
| 1,854,741 | Jackson | Apr. 19, 1932 |

FOREIGN PATENTS

| | | |
|---|---|---|
| 579,010 | Germany | June 19, 1933 |
| 320,234 | Italy | Aug. 10, 1934 |